June 12, 1956     WAYNE W. CHOU     2,749,764
VARIABLE SPEED DRIVE MECHANISM
Filed May 17, 1955
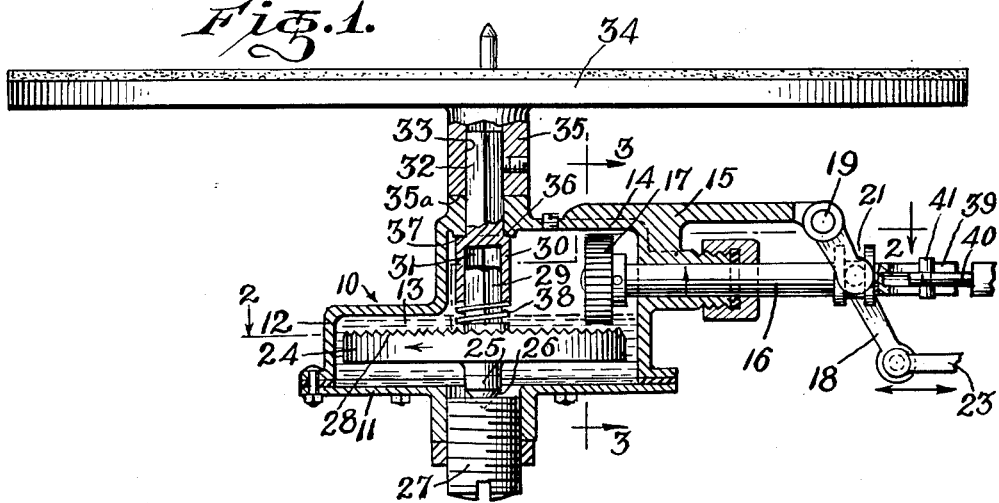
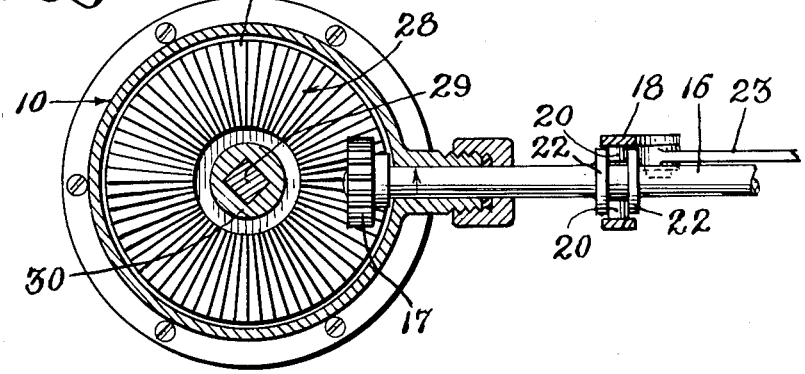
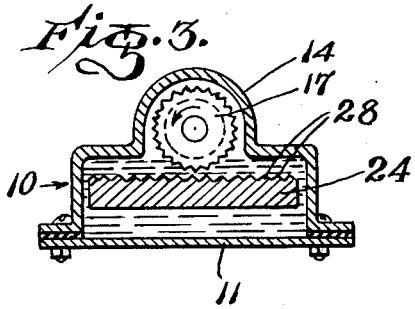
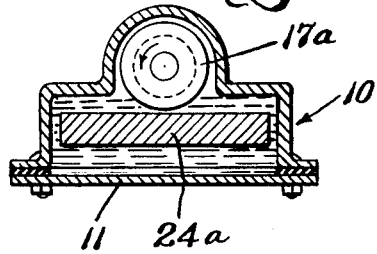
INVENTOR.
Wayne W. Chou
BY F. Ledermann
ATTORNEY.

United States Patent Office 2,749,764
Patented June 12, 1956

2,749,764

VARIABLE SPEED DRIVE MECHANISM

Wayne W. Chou, New York, N. Y.

Application May 17, 1955, Serial No. 509,054

12 Claims. (Cl. 74—352)

This invention relates to variable speed drive mechanisms, and the main object is the provision of a novel and useful improved variable synchronous drive wherein the speed will be constant for a given setting and for varying torques over a certain range of values.

One application of the present invention is to phonograph turntables, where an assortment of constant speeds is required. The present invention meets this demand to perfection in that at any given speed setting the speed is maintained stable and constant irrespective of the varying torques over the given range, and is not subject to variation owing to wear of sensitive parts because it lacks wearable elements which could affect the speed.

The above broad as well as additional and more specific objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown except insofar as they may be deemed essential to the invention.

Referring briefly to the drawing,

Fig. 1 is a central vertical longitudinal section through a variable synchronous drive illustrating one embodiment of the invention as applied to a phonograph turntable.

Fig. 2 is a sectional view taken on the line 2—2 of Fig. 1.

Fig. 3 is a sectional view taken on the line 3—3 of Fig. 1.

Fig. 4 is a view similar to Fig. 3, showing a modified construction, applicable to a case in which the torque required by the load is not great enough to cause slip.

Referring in detail to the drawing, the numeral 10 indicates a closed or sealed housing made of a material possessing a low magnetic reluctance, including the base or floor 11 and the upper, partly cylindrical portion 12 enclosing a compartment 13. The upper portion of the housing has a radial extension 14 which may be secured to a supporting frame 15, or formed integral therewith. The side wall of the extension 14 has a horizontal bearing opening therethrough rotatably and slidably supporting a shaft 16. Inside the housing extension the shaft is provided on its end with a disc or wheel 17 which, in the form shown in Figs. 1 through 3, is toothed or serrated in the fashion of a gear or pinion.

Any suitable means is provided for the purpose of moving the shaft 16 longitudinally in order to move the wheel 17 radially inward or outward in the housing extension 14. The means illustrated comprises a lever 18 pivoted at 19 to the frame 15 and having a pin or pins 20 engaging a circumferential groove 21 provided on the shaft by two spaced rigid collars 22. A rod 23 may be pivoted to the lower end of the lever 18 for remote operation of the latter.

A rotatable platform or turntable-like disc 24 is mounted within the housing 10, and is provided with an axial pin or peg 25 whose lower extremity 26 is tapered and rests rotatably in a complementarily tapered opening in the top of a plug 27 threaded into an axial opening through the base 11. Thus, the disc 24 may be raised or lowered above the base or floor 11 by means of the plug 27. The disc 24, as shown in Figs. 1 through 3, is provided with radial serrations or teeth 28 on its upper surface. A stem 29, axially aligned with the peg 26 and square in cross-section, extends upward from the disc 24. This stem registers in a complementary square socket 31 in a sleeve 30. Approximately intermediate its height, the sleeve 30 has a solid stem 32, also square in cross-section and in alignment with the socket 31, extending upward therefrom. The stem 32 registers in a complementary socket 33 of a turntable 34. The lower end of the sleeve 35 having the socket 33 therein, rests on the horizontal circumferential upper edge 35a of an axial opening through the top of the housing 10. Opposed circumferential shoulders 36 and 37 are formed, respectively, on the ceiling of the housing 10 and the sleeve 30, and the latter is urged against the former by a coiled spring 38 positioned between the sleeve 30 and a boss on the disc 24 and surrounding the stem 29. Thus, the disc 24 is maintained in its adjusted position above the base 11 between the spring 38 and the plug 27.

The interior of the compartment 13 is filled to a degree with an iron oil emulsion, sufficient at least to cover both the disc serrations 28 and the lowermost of the serrations on the wheel or gear 17. Both discs 17 and 24 may preferably be formed of permanent magnetic material of the alnico type because of the high flux density of this material for a given size and weight. The disc 17 is magnetized to make the periphery thereof, i. e., the serrations thereon, of for example, negative or south polar magnetization, and the disc 24 is magnetized to make its serrations of opposite, or positive, magnetization. Whatever the horizontal position of the disc 24, it is never to be in contact with the disc 17.

The iron emulsion between the two discs provides a low reluctance path for good coupling between the discs. A synchronous motor, not shown, is preferably used to drive the shaft 16 at constant speed. For this purpose the outer end of the shaft 16 may be bifurcated to provide longitudinal slots, with the end of the shaft hollowed out to receive slidably the end of the motor shaft 40, with radial pins 41 on the latter registering in the slots 39, thus permitting longitudinal movement of the shaft 16 as set forth above.

In view of the low reluctance path provided by the iron in the emulsion, zero slip occurs between the discs 17 and 24, a torque angle being produced, as in the case of a synchronous motor, for given loads, and there would be slip only if the torque is excessive. Due to the damping action of the iron-oil emulsion, no oscillatory or hunting action will result, thus helping to damp any hunting action of the rotor of the motor. The variation of speed of the disc 24 is obtained, as previously mentioned, by longitudinal movement of the shaft 16.

The object in using serrated or toothed discs, or gears, instead of smooth cylinders or discs, is that thereby slip can be almost entirely eliminated, since the teeth on the discs have a strong hold on the magnetized, solidified iron particles. The teeth may be eliminated if the torque required by the load is not great enough to cause slip. This structure is shown as a modification in Fig. 4, wherein the otherwise identical discs are shown smooth and without teeth at 17a and 24a.

I claim:

1. A variable speed drive mechanism adapted to drive a shaft connected to a load, comprising a hollow housing including a base, a relatively large wheel mounted on a substantially vertical axis in said housing having its upper surface magnetized with a given polarity at the periphery, means rotatably supporting said wheel above said base, a rotatable power shaft extending substantially horizontally and slidably through said housing and having a relatively small wheel thereon within the housing above said large wheel, said small wheel being spaced from said large wheel and being magnetized with a polarity at the periphery opposite said first-named polarity, said housing having therein a quantity of an emulsion containing magnetizable particles to a level at least covering said large wheel and partly covering the periphery of said small wheel.

2. The mechanism set forth in claim 1, said small wheel having spaced serrations on the circumferential edge thereof.

3. The mechanism set forth in claim 1, said large wheel having spaced serrations on at least the radially outward portion of the upper surface thereof.

4. The mechanism set forth in claim 1, said large wheel having radial serrations on the upper surface thereof.

5. The mechanism set forth in claim 1, having means for varying the vertical position of said large wheel in said housing and hence for varying the vertical distance between said wheels.

6. The mechanism set forth in claim 1, said small wheel having spaced serrations on the circumferential edge thereof, said large wheel having radial serrations on the upper surface thereof.

7. The mechanism set forth in claim 1, having means for sliding said power shaft longitudinally and hence moving said small wheel toward or away from the axis of said large wheel.

8. The mechanism set forth in claim 7, said small wheel having spaced serrations on the circumferential edge thereof, said large wheel having radial serrations on the upper surface thereof.

9. The mechanism set forth in claim 7, having means for varying the vertical position of said large wheel in said housing and hence for varying the vertical distance between said wheels.

10. The mechanism set forth in claim 1, having yieldable means normally urging said large wheel downward toward said base and having means for raising said large wheel against the force of said yieldable means.

11. The mechanism set forth in claim 1, said large wheel having an axial peg extending downward therefrom, said base having a threaded opening therethrough, said peg being positioned in axial alignment with said opening, said opening having a plug threaded thereinto, said peg resting rotatably on said plug, said large wheel thereby being adapted to be raised toward said small wheel by screwing said plug farther into said opening or to be lowered by gravity by unscrewing said plug part way from said opening.

12. The mechanism set forth in claim 1, said large wheel having an axial support extending downward therefrom, said base having a threaded opening therethrough coaxial with said support, a plug threaded into said opening, said support resting rotatably on said plug, said large wheel thereby being adapted to be raised or lowered by rotating said plug, and yieldable means normally urging said large wheel downward.

References Cited in the file of this patent
UNITED STATES PATENTS

| | | |
|---|---|---|
| 1,368,587 | Villiers | Feb. 15, 1921 |
| 2,575,360 | Rabinow | Nov. 20, 1951 |
| 2,640,364 | Nelson | June 2, 1953 |
| 2,688,879 | Logan et al. | Sept. 14, 1954 |
| 2,718,157 | Schaub | Sept. 20, 1955 |

OTHER REFERENCES

National Bureau of Standards Technical Bulletin No. 12, vol. 34, December 1950, pp. 169–174.